US006924736B2

(12) United States Patent
Oexmann et al.

(10) Patent No.: US 6,924,736 B2
(45) Date of Patent: Aug. 2, 2005

(54) VEHICLE COLLISION WARNING SYSTEM

(75) Inventors: Dale F. Oexmann, 211 Arcadia Dr., Terre Haute, IN (US) 47803; Kevin R. Beto, Redmond, WA (US); Matthew W. Lueck, Tulsa, OK (US); Christopher W. Maurer, Indianapolis, IN (US); Shane B. Stanford, Surfside Beach, SC (US)

(73) Assignee: Dale F. Oexmann, Terre Haute, IN (US)

( * ) Notice: Subject to any disclaimer, the term of this patent is extended or adjusted under 35 U.S.C. 154(b) by 9 days.

(21) Appl. No.: 10/462,985

(22) Filed: Jun. 17, 2003

(65) Prior Publication Data

US 2003/0212488 A1 Nov. 13, 2003

Related U.S. Application Data

(63) Continuation of application No. 09/788,778, filed on Feb. 20, 2001, now abandoned.
(60) Provisional application No. 60/183,726, filed on Feb. 20, 2000.

(51) Int. Cl.[7] .............................. B60Q 1/00; B60Q 1/16; G08G 1/123; G01C 21/26; G01C 21/28; G01C 21/34; G01C 21/36
(52) U.S. Cl. ..................... 340/436; 340/435; 340/903; 340/988; 340/995.1; 340/992.25; 701/213; 701/214; 701/215; 701/216; 701/301
(58) Field of Search ............................... 340/435, 436, 340/903, 988, 995.1, 955.25; 701/213–216, 301

(56) References Cited

U.S. PATENT DOCUMENTS

| 5,574,469 | A | * | 11/1996 | Hsu | 342/455 |
| 5,907,293 | A | * | 5/1999 | Tognazzini | 340/903 |
| 6,275,773 | B1 | * | 8/2001 | Lemelson et al. | 701/301 |
| 6,405,132 | B1 | * | 6/2002 | Breed et al. | 701/301 |
| 6,449,559 | B2 | * | 9/2002 | Lin | 701/216 |

* cited by examiner

Primary Examiner—Jeffrey Hofsass
Assistant Examiner—Lam Pham
(74) Attorney, Agent, or Firm—Barnes & Thornburg LLP

(57) ABSTRACT

A first vehicle includes a first device for receiving global positioning system (GPS) signals, generating at least one of a first time, position and velocity signal based on the received GPS signals, generating at least one of a second time, position and velocity signal based upon the motion of the first vehicle, comparing the first and second signals, generating a corrected first vehicle signal, and transmitting the corrected first vehicle signal. A second vehicle includes a second device for receiving GPS signals, generating at least one of a third time, position and velocity based on the received GPS signals, generating at least one of a fourth time, position and velocity based on the motion of the second vehicle, comparing the third and fourth signals, generating a corrected second vehicle signal, receiving the corrected first signal, and calculating from the corrected first and second vehicle signals the likelihood that the positions of the first and second vehicles will coincide at some time.

15 Claims, 3 Drawing Sheets

VEHICLE COLLISION WARNING SYSTEM

This application is a continuation of application Ser. No. 09/788,778 filed on Feb. 20, 2001, now abandoned, which claims the benefit of provisional application 60/183,726 filed on Feb. 20, 2000.

FIELD OF THE INVENTION

This invention relates to vehicle proximity warning systems. It is disclosed in the context of a system for warning vehicles approaching railroad crossings of the proximity of trains. However, it is believed to be useful in other applications as well.

DISCLOSURE OF THE INVENTION

According to the invention, a first vehicle includes a first device for receiving global positioning system (GPS) signals, generating at least one of a first time, position and velocity signal based on the received GPS signals, generating at least one of a second time, position and velocity signal based upon the motion of the first vehicle, comparing the first and second signals, generating at least one of a corrected first vehicle time, position and velocity signal, and transmitting the corrected first signal. A second vehicle includes a second device for receiving GPS signals, generating at least one of a third time, position and velocity based on the received GPS signals, generating at least one of a fourth time, position and velocity based on the motion of the second vehicle, comparing the third and fourth signals, generating a corrected second vehicle signal, receiving the corrected first signal, and calculating the likelihood that the positions of the first and second vehicles will coincide at some time.

According to an illustrative embodiment of the invention, the system further includes a third device for receiving differential GPS (DGPS) correction signals and retransmitting the DGPS correction signals. The first device receives the DGPS correction signals and combines the DGPS correction signals with the GPS signals to generate the first signal.

Further according to an illustrative embodiment of the invention, the second device receives the DGPS correction signals and combines the DGPS correction signals with the GPS signals to generate the third signal.

Additionally illustratively according to the invention, the first vehicle includes a device for recording the corrected first vehicle signal.

Illustratively according to the invention, the second vehicle includes a device for recording the corrected second vehicle signal.

Further illustratively according to the invention, the second device produces an indication to an occupant in the second vehicle that the it is likely that the positions of the first and second vehicles will coincide at some time.

Illustratively according to the invention, the indication is a visual indication.

Illustratively according to the invention, the indication is an audible indication.

Further illustratively according to the invention, the second vehicle includes a display coupled to the second device for indicating at least one of: the location of the first vehicle; the velocity of the first vehicle; the direction of travel of the first vehicle; the location of the second vehicle; the velocity of the second vehicle; and the direction of travel of the second vehicle.

Illustratively according to the invention, the display indicates the current positions of the first and second vehicles.

BRIEF DESCRIPTION OF THE DRAWINGS

The invention may best be understood by referring to the following detailed description and accompanying drawings which illustrate the invention. In the drawings.

DETAILED DESCRIPTIONS OF ILLUSTRATIVE EMBODIMENTS

Figure 1:
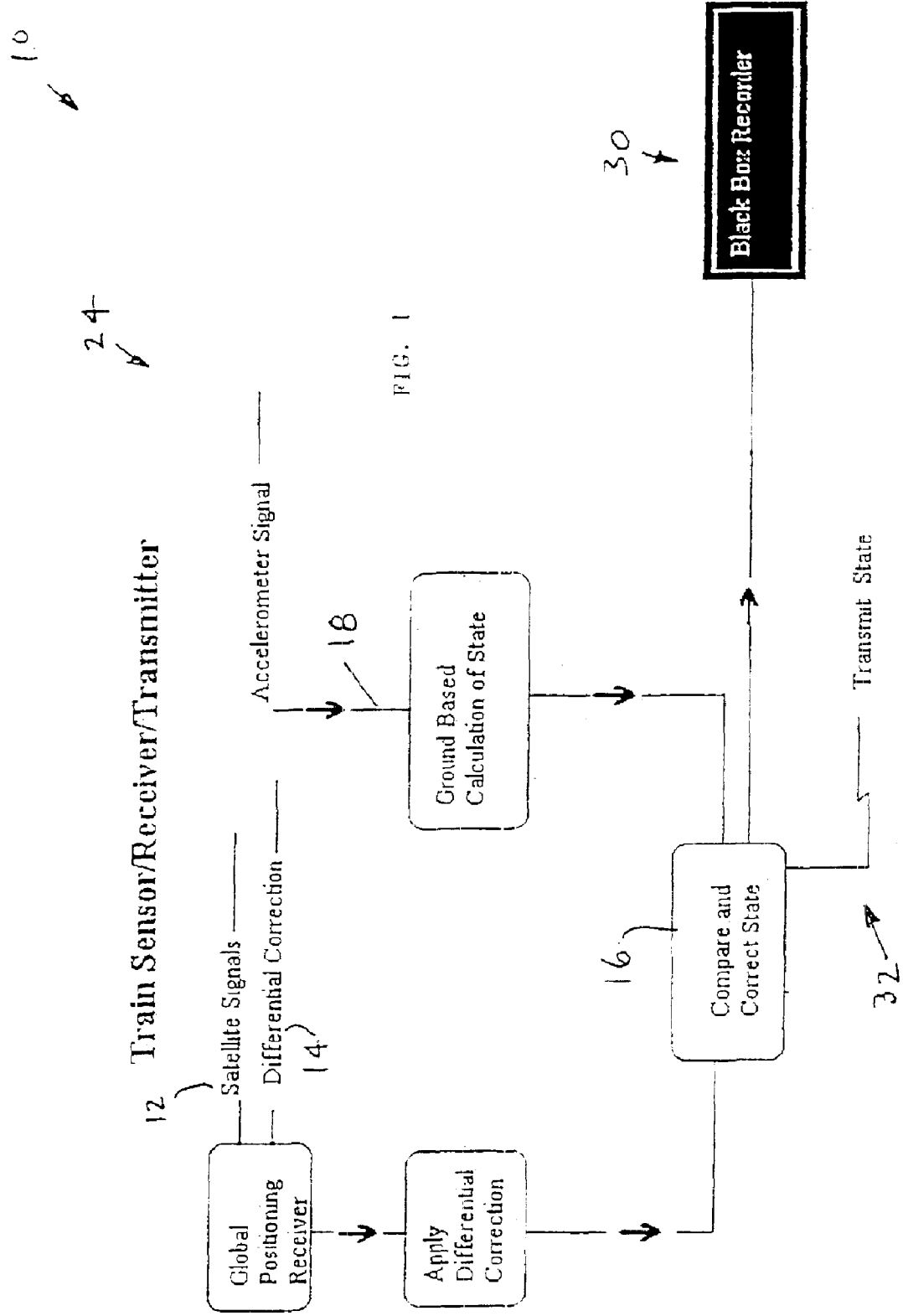
FIG. 1 illustrates a partly block and partly flow diagram for a component constructed according to the invention.

Referring now to FIG. 1, a system 10 provides a warning to vehicles traveling toward a railroad crossing of impending danger from a train either blocking the crossing or close enough to the crossing that there is a danger of collision. The positions, speeds and directions of travel of both the vehicle and train are determined using Global Positioning System (GPS) signals 12 and corrections from Differential Global Positioning Satellite (DGPS) signals 14 are used to calculate the distance between the two vehicles as well as project their arrival at the crossing. This information is further compared and corrected 16 by calculated position and velocity, using data 18 from accelerometer sensors on the vehicle and train.

The vehicle/train state can be one of the following: no known train within receiving distance of a receiver in the vehicle; a train has been detected within range of the receiver; the train and vehicle are both approaching the crossing at such a rate that, from their current positions, if they continue there is danger of collision; the train and vehicle are both approaching the crossing at such a rate that, from their current positions, if they continue a collision is practically certain; and, interference is such that no reliable signal can be received from the satellite or train on a timely basis.

Audible 20 or visual 22 indication, or both, of the above states can be provided.

The system 10 is not intended to replace the existing light and crossing gates in place at some crossings.

Figure 2:
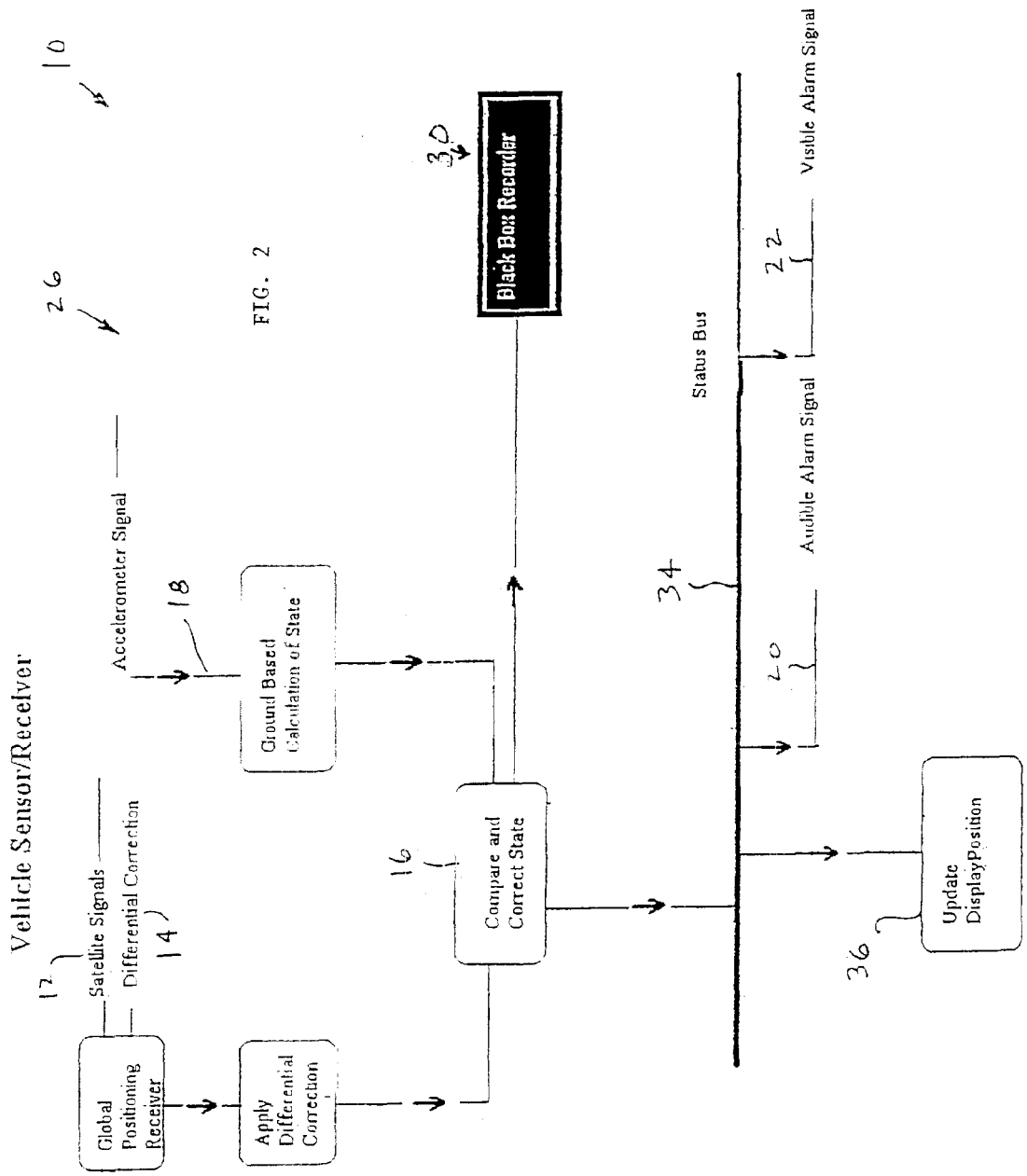
FIG. 2 illustrates a partly block and partly flow diagram for a component constructed according to the invention; and, FIG. 3 illustrates a partly block and partly flow diagram for a component constructed according to the invention.
Figure 3:
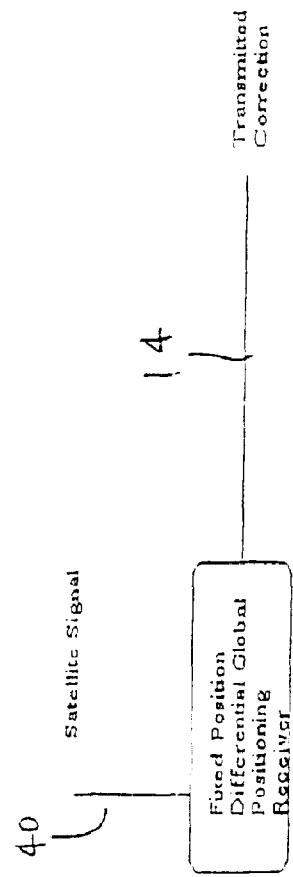

There are three major communicating components to the system 10. Referring to FIG. 1, the first is a Train Sensor/Receiver/Transmitter (TSRT) 24. One of these will be placed on a car or engine at each end of the train. Referring to FIG. 2, the second component is a Vehicle Sensor/Receiver (VSR) 26. One of these will be placed on each road vehicle. Referring to FIG. 3, the optional third component is a Ground-Based Differential Correction Receiver/Transmitter (GBDCR) 28. These will be positioned so that at any time each train and vehicle will be close enough to at least one, so that the train and vehicle can receive the correction signal.

Referring back to FIG. 1, the the TSRT 24 receives GPS satellite signals 12, receives differential GPS correction 14 when the GPS signal is scrambled, and calculates 16 at least one of, and illustratively all of, time, position and velocity based on this input. The TSRT 24 maintains a separate time and/or position and/or velocity based on a processor time and an onboard signal 18 from an accelerometer, compares and computes 16 a corrected time and/or position and/or velocity based on both. The TSRT 24 further records 30 the current state, time and/or position and/or velocity to a black box for a permanent log on the train and vehicle. The TSRT 24 also broadcasts 32 a transmission, for example, a digital transmission, of this state to be received and processed by any vehicle equipped with a VSR 26.

Referring back to FIG. 2, the VSR 26 receives GPS satellite signals 12, receives differential GPS correction 14 when the GPS signal is scrambled, and calculates 16 time and/or position and/or velocity based on this input. The VSR 26 maintains a separate time and/or position and/or velocity based on a processor time and an onboard signal from an accelerometer 18. The VSR 26 compares and computes 16 a corrected time and/or position and/or velocity based on both the GPS-calculated time and the onboard accelerometer 18-based time. The VSR 26 records 30 the current state, time and/or position and/or velocity to a black box for a permanent log. The VSR 26 determines the current status, vehicle time and/or position and/or velocity, and the train time and/or position and/or velocity. The VSR 26 maintains this vehicle/train state on its system bus 34 in order to provide to warning devices the information needed to provide the appropriate warning. The VSR 26 maintains the current train state and vehicle state on the system bus 34 to be used by a display 36 processor. The display 36 processor presents a map with the surrounding roadway, train track and intersection, marking the current position(s) of train(s) and/or vehicle(s). It should be understood that many road vehicles are already equipped with GPS receivers. In such cases, all that would need to be provided is an output from the existing GPS receiver to the VSR 26.

Referring again to FIG. 3, if the GPS signal is scrambled, the GBDCR 28 receives differential correction signals 40 from the satellite, and relays corrections 14 to all trains and vehicles equipped with a TSRT 24 or VSR 26 by broadcast.

It is contemplated that part of the vehicle state that is transmitted will be the vehicle's identity, for example, the VIN number or some other unique identification.

Although the invention has been presented in the context of a system for avoiding collisions between trains and road vehicles, it is clear that the same components can be used on any two or more trains or other vehicles to avoid collisions between them. Each participating vehicle needs both components, the TSRT 24 and the VSR 26. Since the two components 24, 26 share some functionality, integrating them into a single component is a reasonable approach to satisfying their requirements.

Examples of such uses in vehicle-to-vehicle collision avoidance systems include, but are not limited to: use on emergency vehicles, such as ambulances and fire trucks, and other vehicles to warn the other vehicles of the proximity of emergency vehicles; use on two vehicle traveling the same route in the same direction in low visibility conditions, such as fog, rain or snow, to warn of proximity; and for identification of congestion caused by road construction, accidents or the like.

What is claimed is:

1. A system for reducing the likelihood of collision between a first vehicle and a second vehicle, the first vehicle including a first device for receiving global positioning system (GPS) signals, generating at least one of a first time, position and velocity signal based on the received GPS signals, generating at least one of a second time, position and velocity signal based upon the motion of the first vehicle, comparing the first and second signals, generating a corrected first vehicle signal, and transmitting the corrected first vehicle signal, the second vehicle including a second device for receiving GPS signals, generating at least one of a third time, position and velocity based on the received GPS signals, generating at least one of a fourth time, position and velocity based on the motion of the second vehicle, comparing the third and fourth signals, generating a corrected second vehicle signal, receiving the corrected first signal, and calculating from the corrected first and second vehicle signals the likelihood that the positions of the first and second vehicles will coincide at some time.

2. The system of claim 1 further including a third device for receiving differential GPS (DGPS) correction signals and retransmitting the DGPS correction signals, the first device receiving the DGPS correction signals and combining the DGPS correction signals with the GPS signals to generate the at least one of the first time, position and velocity signal.

3. The system of claim 2 wherein the second device receives the DGPS correction signals and combines the DGPS correction signals with the GPS signals to generate the at least one of the third time, position and velocity signal.

4. The system of claim 1 further including a third device for receiving differential GPS correction signals and retransmitting the DGPS correction signals, the second device receiving the DGPS correction signals and combining the DGPS correction signals with the GPS signals to generate the at least one of the third time, position and velocity signal.

5. The system of claim 2 wherein the first vehicle further includes a fourth device for recording the corrected first vehicle signal.

6. The system of claim 5 wherein the second vehicle further includes a fifth device for recording the corrected second vehicle signal.

7. The system of claim 2 wherein the first vehicle further includes a fourth device for recording the corrected second vehicle signal.

8. The system of claim 1 wherein the first vehicle further includes a fourth device for recording the corrected first vehicle signal.

9. The system of claim 8 wherein the second vehicle further includes a fifth device for recording the corrected second vehicle signal.

10. The system of claim 1 wherein the first vehicle further includes a fourth device for recording the corrected second vehicle signal.

11. The system of claim 1 wherein the second device further produces an indication to an occupant in the second vehicle that it is likely that the positions of the first and second vehicles will coincide at some time.

12. The system of claim 11 wherein the indication is a visual indication.

13. The system of claim 11 wherein the indication is an audible indication.

14. The system of claim 1 wherein the second vehicle includes a display coupled to the second device for indicating at least one of: the location of the first vehicle; the velocity of the first vehicle; the direction of travel of the first vehicle; the location of the second vehicle; the velocity of the second vehicle; and the direction of travel of the second vehicle.

15. The system of claim 14 wherein the display indicates the current positions of the first and second vehicles.

* * * * *